United States Patent
Shibata et al.

[11] Patent Number: 5,251,279
[45] Date of Patent: Oct. 5, 1993

[54] OPTICAL CONNECTOR WITH MOLDED-ON RESIN BOOT COVERING DISTAL ENDS OF TENSION MEMBER AND SHEATH OF OPTICAL FIBER

[75] Inventors: Nobuyuki Shibata; Kenji Suzuki; Ren-ichi Yuguchi, all of Tokyo, Japan

[73] Assignee: The Furukawa Electric Co., Ltd., Tokyo, Japan

[21] Appl. No.: 834,336

[22] PCT Filed: Jun. 18, 1991

[86] PCT No.: PCT/JP91/00814
  § 371 Date: Feb. 13, 1992
  § 102(e) Date: Feb. 13, 1992

[87] PCT Pub. No.: WO91/20008
  PCT Pub. Date: Dec. 26, 1991

[30] Foreign Application Priority Data
  Jun. 19, 1990 [JP] Japan .................. 2-64687[U]

[51] Int. Cl.$^5$ ................................. G02B 6/36
[52] U.S. Cl. ............................. 385/86; 385/60; 385/78
[58] Field of Search .............. 385/86, 60, 78, 76, 385/100, 69, 87

[56] References Cited

U.S. PATENT DOCUMENTS

| | | | |
|---|---|---|---|
| 4,264,128 | 4/1981 | Young | 350/96.20 |
| 4,896,939 | 1/1990 | O'Brien | 350/96.23 |
| 5,058,983 | 10/1991 | Corke et al. | 385/78 |
| 5,073,044 | 12/1991 | Egner et al. | 385/86 |

FOREIGN PATENT DOCUMENTS

| | | | |
|---|---|---|---|
| 58-42966 | 9/1983 | Japan | |
| 60-130409 | 8/1985 | Japan | |
| 4039608 | 2/1992 | Japan | 385/86 |

Primary Examiner—John D. Lee
Assistant Examiner—Phan T. Heartney
Attorney, Agent, or Firm—Frishauf, Holtz, Goodman & Woodward

[57] ABSTRACT

An optical connector which comprises a ferrule 9, provided on the distal end of an optical fiber cord having a jacketed optical fiber 1 covered by a sheath 3 with a tension member 2 in between, and a stop ring 7 whose distal end position is regulated by the ferrule 9. A resin boot 11 for integrally fixing the respective distal ends of the tension member 2 and the sheath 3 is provided on the rear half of the stop ring 7 by molding.

7 Claims, 5 Drawing Sheets

5,251,279

OPTICAL CONNECTOR WITH MOLDED-ON RESIN BOOT COVERING DISTAL ENDS OF TENSION MEMBER AND SHEATH OF OPTICAL FIBER

TECHNICAL FIELD

The present invention relates to an optical connector for optically connecting jacketed optical fibers.

BACKGROUND OF THE INVENTION

As shown in FIG. 3, an optical fiber cord includes a jacketed optical fiber 1 formed of an optical fiber 1a covered by a coating 1b of nylon or the like, a tension member 2 of aramid fibers (filaments) or the like arranged around the jacketed optical fiber 1, and a sheath 3 of polyvinyl chloride (PVC) covering these elements. An optical connector for optically connecting optical fiber cords is attached to an end portion of the jacketed optical fiber 1.

This optical connector is assembled from a plurality of components. As shown in FIG. 4, for example, a rubber boot 4, ring 5, caulking ring 6, stop ring 7, and spring 8 are previously mounted, in the order named, on the optical fiber cord to which the optical connector is attached.

The sheath 3 at the distal end portion of the optical fiber cord is removed, and a ferrule 9 is attached to the distal end of the exposed jacketed optical fiber 1. Then, the components 4 to 8 are successively pushed out toward the ferrule 9 in front, as indicated by the arrows, and are fixed to one another, and thereafter, a plug frame 10 is fitted on them, whereupon the optical connector is assembled. Conventionally, these operations are performed manually.

In performing this assembling operation, the caulking ring 6 is staked (i.e., pressed) so that the tension member (filaments or fibers) 2 is caught and held between the caulking ring 6 and the stop ring 7, and the distal end of the sheath 3 is held between the ring 5 and the caulking ring 6, as shown in FIG. 5, thereby providing the tensile strength of a mounting portion of the optical fiber cord for the optical connector.

When the caulking ring 6 and the stop ring 7 are pushed out forward, in assembling this optical connector, the tension member 2 and the sheath 3 are inevitably caught between the jacketed optical fiber 1 and the stop ring 7 and between the jacketed optical fiber 1 and the caulking ring 6, respectively, as shown in FIG. 6. In the assembling operation for the optical connector, therefore, the tension member 2 and the sheath 3 must be drawn out of the stop ring 7 and the caulking ring 6, respectively, before staking the caulking ring 6.

Having a wall thickness greater than that of the tension member 2, however, the sheath 3 cannot be easily drawn out of the caulking ring 6, so that the removal work is very troublesome. Thus, the assembling operation for the optical connector is difficult, so that the productivity is low, and moreover, the assembling operation for the optical connector cannot be mechanized.

The present invention has been contrived in consideration of these circumstances, and its object is to provide a high-productivity optical connector which is attached to an end portion of an optical fiber cord, and whose assembling operation is easy and can be mechanized.

SUMMARY OF THE INVENTION

In order to achieve the above object, according to the present invention, there is provided an optical connector which comprises a ferrule, provided on the distal end of an optical fiber cord having a jacketed optical fiber covered by a sheath with a tension member in between, and a stop ring whose distal end position is regulated by the ferrule, in which a resin boot for integrally fixing the respective distal ends of the tension member and the sheath is provided on the rear half of the stop ring by molding.

The resin boot, which integrally fixes the respective distal ends of the tension member and the sheath by the insert molding method, functions as a rubber boot in a conventional optical connector.

BRIEF DESCRIPTION OF THE DRAWINGS

FIGS. 1 and 2 show one embodiment of an optical connector according to the present invention, in which FIG. 1 is a sectional front view of the principal part of the optical connector, and FIG. 2 is a perspective view showing the way of molding a resin boot provided on the respective distal ends of a tension member and a sheath and integrally fixing them; and FIGS. 3 to 6 illustrate the construction of a conventional optical connector, in which FIG. 3 is a front view showing the construction of an optical fiber cord, FIG. 4 is an exploded view for illustrating the assembly of the optical connector, FIG. 5 is a sectional view of the principal parts showing the way a tension member is held by means of a stop ring and a caulking ring, and FIG. 6 is a sectional view of the principal parts showing the positional relationships between the stop ring, caulking ring, and tension member.

DETAILED DESCRIPTION

Figure 1:
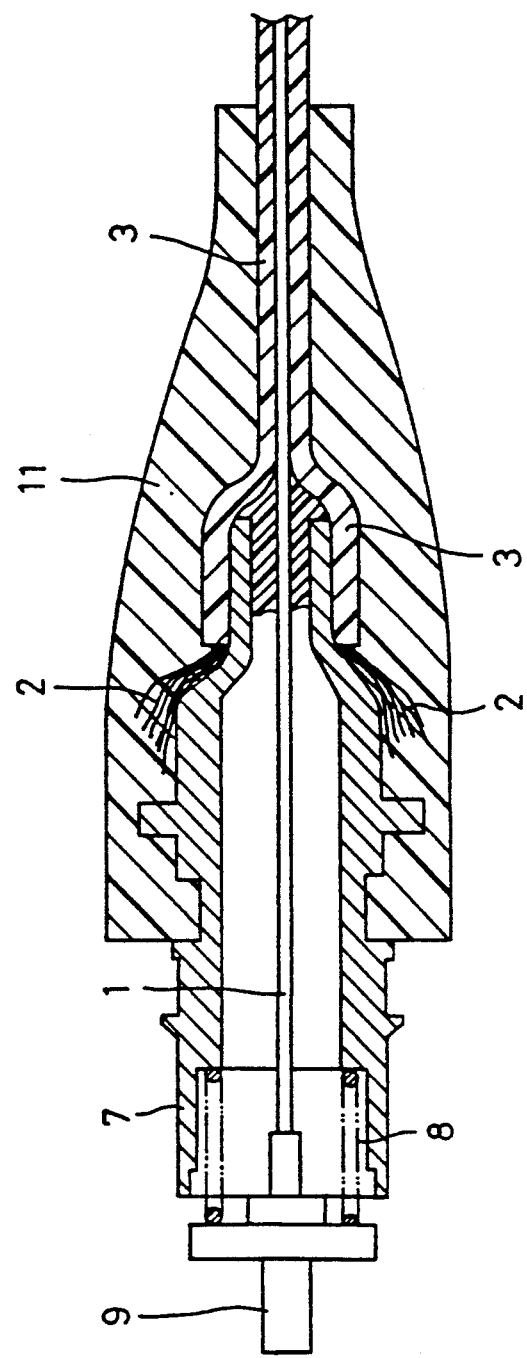
Figure 2:
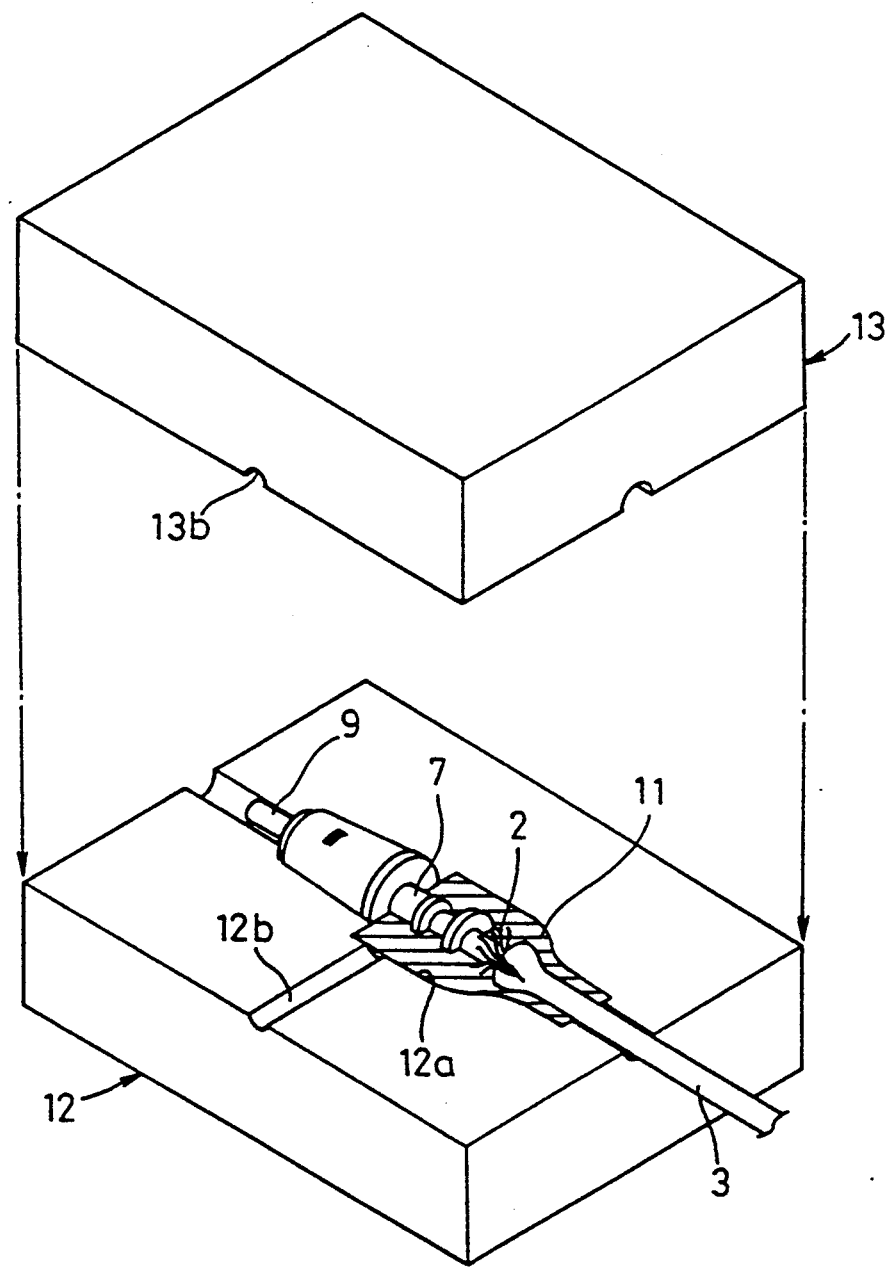
Figure 3:
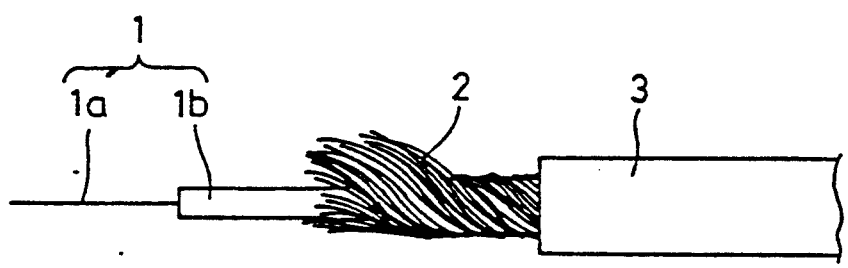

Referring now to FIGS. 1 and 2, one embodiment of the present invention will be described in detail. In the description to follow, like reference numerals are used to designate the same components as those of the conventional optical connector described before.

In an optical connector of the present invention, as shown in FIG. 1, a spring 8 is interposed between a ferrule 9, which is attached to the distal end of a jacketed optical fiber 1, and a stop ring 7 arranged adjacent to the ferrule 9. And a resin boot 11 is provided on the rear half of the stop ring 7.

The resin boot 11, which is molded by the insert molding method, serves to integrally fix the respective distal ends of a tension member 2 and a sheath 3, and to protect the rear half of the optical connector.

A resin plug frame (not shown) is fitted on the front half the stop ring 7, which has the resin boot 11 molded thereon.

The optical connector with this construction is assembled in the following manner.

First, the stop ring 7 and the spring 8 are previously mounted on an optical fiber cord.

Subsequently, the sheath 3 at the distal end portion of the optical fiber cord is removed for a predetermined length, and the ferrule 9 is attached to the distal end of the exposed jacketed optical fiber 1.

Thereafter, the stop ring 7, along with the spring 8, is pushed out toward the ferrule 9 in front so that the distal end of the stop ring 7 abuts against the rear end of the ferrule 9.

Then, the respective distal ends of the tension member 2 and the sheath 3, caught between the jacketed optical fiber 1 and the stop ring 7 as the stop ring 7 is pushed out, are drawn out of the stop ring 7.

Subsequently, the ferrule 9, engaged with the distal end of the stop ring 7, is mounted, along with the jacketed optical fiber 1, on a lower mold 12 which has a recess 12a, corresponding in shape to the resin boot 11, and an injection groove 12b, as shown in FIG. 2.

Then, an upper mold 13, which has a recess (not shown) and an injection groove 13b similar to those of the lower mold 12, is placed on the lower mold 12 in the manner indicated by the chain lines.

Thereafter, a resin is poured into both molds 12 and 13 through a passage defined by the injection grooves 12b and 13b as a runner, whereupon the resin boot 11 is molded on the rear half of the stop ring 7. In this manner, the respective distal ends of the filaments of the tension member 2 and the sheath 3 of the optical fiber cord are integrally fixed by means of the molded resin boot 11.

Subsequently, the plug frame (not shown) is fitted on the front half the stop ring 7, whereupon assembling the optical connector is completed.

Figure 4:
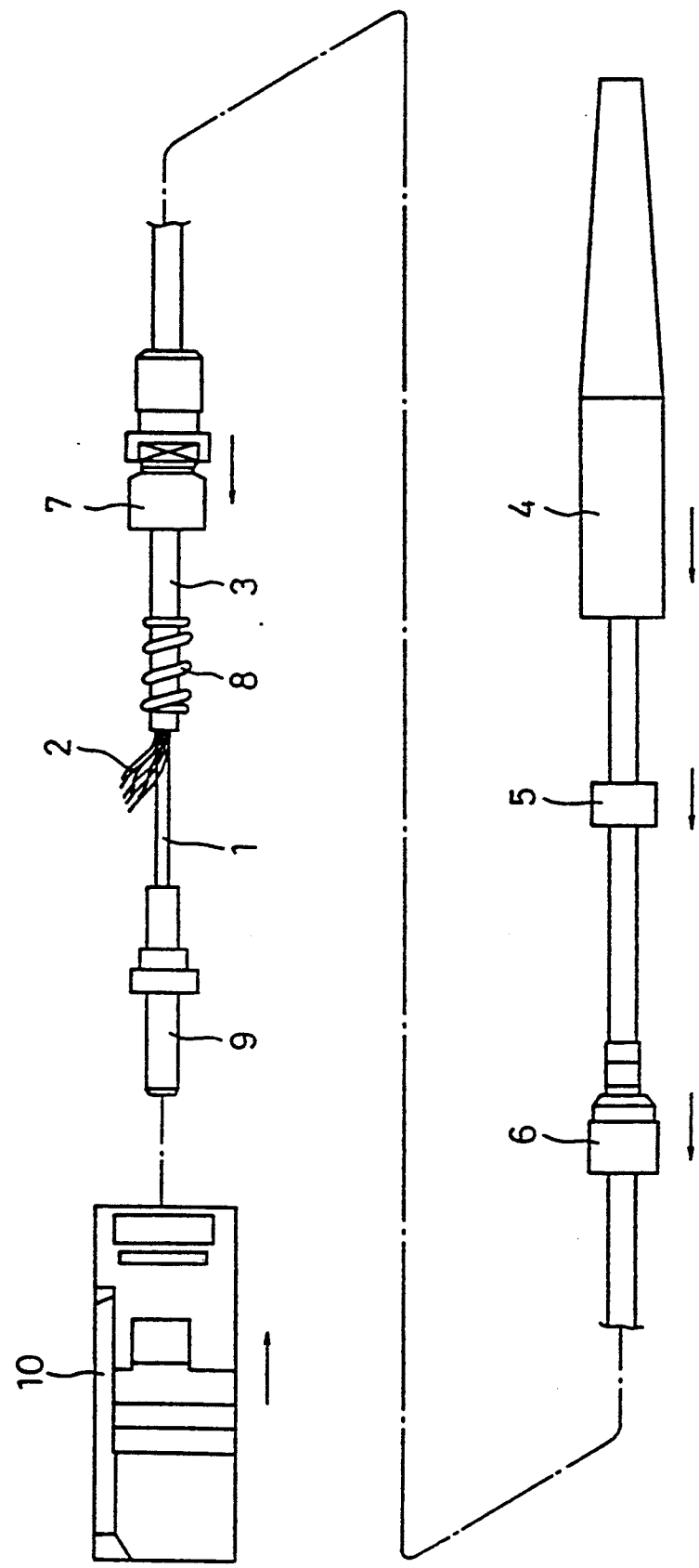
Figure 5:
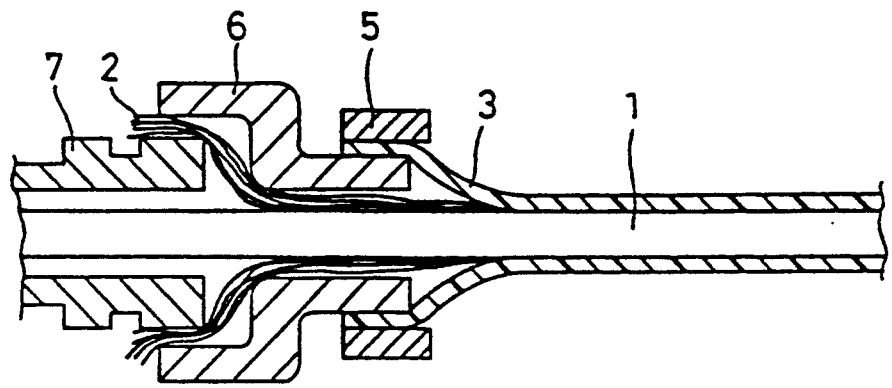
Figure 6:
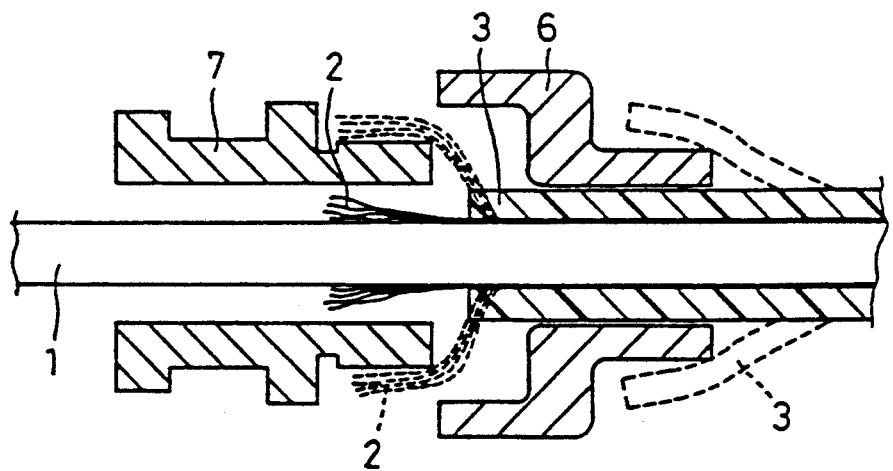

Thus, in the optical connector of the present invention, the respective distal ends of the filaments of the tension member 2 and the sheath 3 are buried in the resin of the molded resin boot 11 and are fixed integrally with the resin boot 11. Unlike the conventional optical connector, therefore, the optical connector of the invention does not require use of the ring 5 and the caulking ring 6 of the prior art (FIG. 4-6).

INDUSTRIAL APPLICABILITY

In the optical connector of the present invention, as is evident from the above description, the resin boot 11 which integrally fixes the respective distal ends of the tension member 2 and the sheath 3, is provided on the rear half of the stop ring 7 by molding, so that the resin boot 11 can be molded by only drawing out the tension member and the sheath, caught between the stop ring and the jacketed optical fiber, from the stop ring, and therefore, assembling the optical connector is easy.

Further, the prior art caulking ring or ring for holding the tension member and the sheath need not be used, so that the components used can be reduced in number. As compared with the case of the conventional optical connector, therefore, the productivity is much improved, and assembling the optical connector can be mechanized and automated.

Since the tension member and the sheath are buried in the molded resin boot, moreover, the optical connector of the invention can enjoy various industrial applications, taking advantage of, for example, its tensile strength higher than that of the conventional optical connector in which the tension member and the sheath are fixed by caulking.

We claim:

1. An optical connector for use with an optical fiber cord having a jacketed optical fiber covered by a sheath with a tension member between the sheath and the jacketed optical fiber, comprising:
    a ferrule provided on a distal end of said optical fiber cord;
    an elongated stop ring also provided on said distal end of said optical fiber cord, and whose distal end position on said optical fiber cord is regulated by said ferrule; and
    a molded-on resin boot, which is molded onto distal ends of said tension member and said sheath, for integrally fixing the respective distal ends of both said tension member and said sheath, said resin boot being also molded onto a rear portion of said stop ring and onto a portion of said sheath and tension member, said resin boot not extending to the front end of said stop ring.

2. An optical connector according to claim 1, wherein said resin boot is molded onto the distal end of said optical fiber cord by insert molding.

3. An optical connector according to claim 1, wherein said resin boot is molded over only about one-half the length of said elongated stop ring.

4. An optical connector according to claim 3, wherein said stop ring has projecting portions thereon, said resin boot being molded over said projecting portions to increase retention of said resin boot on said stop ring.

5. An optical connector according to claim 1, wherein said stop ring has projecting portions thereon, said resin boot being molded over said projecting portions to increase retention of said resin boot on said stop ring.

6. An optical connector according to claim 1, wherein said tension member comprises a plurality of elongated filaments.

7. An optical connector according to claim 6, wherein said filaments of said tension member are distributed around said stop ring inside said molded-on resin boot.

* * * * *